A. FISCHER.

Liquid Cooler.

No. 2,292. Reissued June 26, 1866.

Witnesses:

Jos. A. Spence
Theo Tusch

Inventor:

Adelbert Fischer
Per Munn & Co
Attorneys.

AM. PHOTO-LITHO. CO. N.Y. (OSBORNE'S PROCESS.)

UNITED STATES PATENT OFFICE.

ADALBERT FISCHER, OF NEW YORK, N. Y.

IMPROVED LIQUID-COOLER.

Specification forming part of Letters Patent No. 54,708, dated May 15, 1866; Reissue No. 2,292, dated June 26, 1866.

*To all whom it may concern:*

Be it known that I, ADALBERT FISCHER, of No. 198 East Twenty-ninth street, in the city, county, and State of New York, have invented a new Improvement in Liquid-Coolers; and I do hereby declare that the following is a full, clear, and exact description thereof, enabling those skilled in the art to fully understand and use the same, reference being had to the accompanying drawings, in which—

Figure 1:
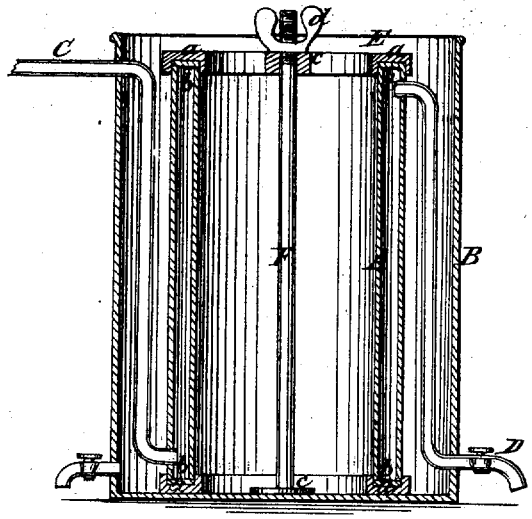
Figure 2:
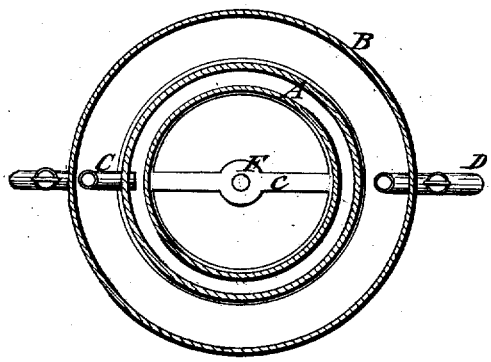

Figure 1 represents a vertical central section of this invention. Fig. 2 is a horizontal section of the same.

Similar letters of reference indicate corresponding parts.

This invention relates to an improvement in that class of liquid-coolers on which a patent has been granted to me March 20, 1866, and which are composed of one or more annular cylinders which are in contact on the inside and outside with the cooling-liquid, and through which the liquid to be cooled is made to pass.

My present improvement consists in providing the annular cylinders with movable heads which are held in position by one or more bolts, the joint being rendered tight by suitable packing in such a manner that, by unscrewing said bolt or bolts the heads are released, and access can be had to the interior of the annular cylinder or cylinders, for the purpose of cleaning.

A represents an annular cylinder which is situated in a vessel, B, the diameter and height of which are larger than those of the annular cylinder, so that water or ice or other cooling medium can be brought in contact with the inner and outer surfaces of the annular cylinder.

A supply-pipe, C, serves to conduct the liquid to be cooled into the annular cylinder near its bottom, and said liquid, after having passed through the cylinder, escapes through the discharge-pipe D.

The heads E of the annular cylinder are held in their places by one or more bolts, F, and they are provided with annular recesses *a*, capable of receiving suitable packing-pieces *b*, and if the heads are applied to the cylinder the rims or edges of the annular recesses catch over the ends of the cylinder, as clearly shown in Fig. 1.

The bolt or bolts may be made to pass through cross-bars *c* in the heads, or through suitable ears on the inside or outside of the heads, or through the heads themselves, and by screwing up the nut or nuts *d* both heads are drawn up tight. By unscrewing said nut or nuts the heads are released, and easy access can be had to the interior of the cylinder A for the purpose of cleaning. In order to keep the bolt or bolts in an upright position it or they may be tapped into the bottom cross-bar or any part of the bottom head.

The heads E are cast, and they are made cheap and durable, and by the use of suitable packing the joints between said heads and the ends of the cylinder are rendered tight without difficulty.

What I claim as new, and desire to secure by Letters Patent, is—

The movable heads E, with annular recesses *a*, in combination with one or more bolts, F, annular cylinder A, and vessel B, all constructed and operating substantially as and for the purpose described.

ADALBERT FISCHER.

Witnesses:
W. HAUFF,
E. HAUFF.